United States Patent

[11] 3,584,672

| [72] | Inventor | Victor Duquesne<br>42 Quellinstr, Antwerpen, Belgium |
|---|---|---|
| [21] | Appl. No. | 812,719 |
| [22] | Filed | Apr. 2, 1969 |
| [45] | Patented | June 15, 1971 |
| [32] | Priority | Apr. 4, 1968 |
| [33] | | Belgium |
| [31] | | 47,823 |

[54] DEVICE FOR MOUNTING AND DISMOUNTING AUTOMOBILE TIRES
3 Claims, 3 Drawing Figs.

[52] U.S. Cl. .................................................. 157/1.3
[51] Int. Cl. .................................................. B60c 25/04
[50] Field of Search .................................... 157/1.22, 1.24, 1.3

[56] References Cited
UNITED STATES PATENTS

| 1,307,131 | 6/1919 | Kimbel | 157/1.22 |
| 2,273,340 | 2/1942 | Van Zale | 157/1.22 |
| 3,164,197 | 1/1965 | Bishman et al. | 157/1.3 |

*Primary Examiner*—Granville Y. Custer, Jr.
*Attorney*—Linton & Linton

ABSTRACT: The present device is for mounting and dismounting tires on wheels using a lever having a tire mounting element on one end and a tire dismounting element on the other end and an arm for supporting the lever having rotary means for riding on the wheel rim upon movement of said lever in a circle.

PATENTED JUN 15 1971
3,584,672
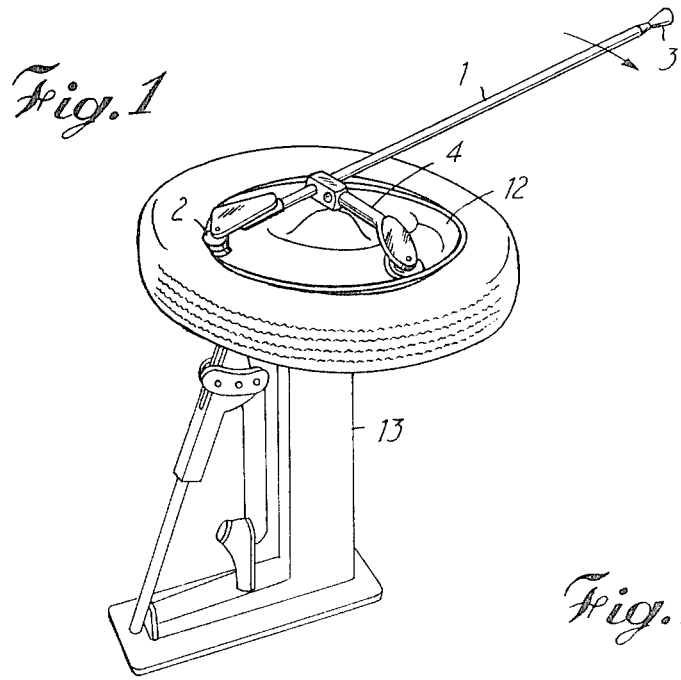
Fig.1
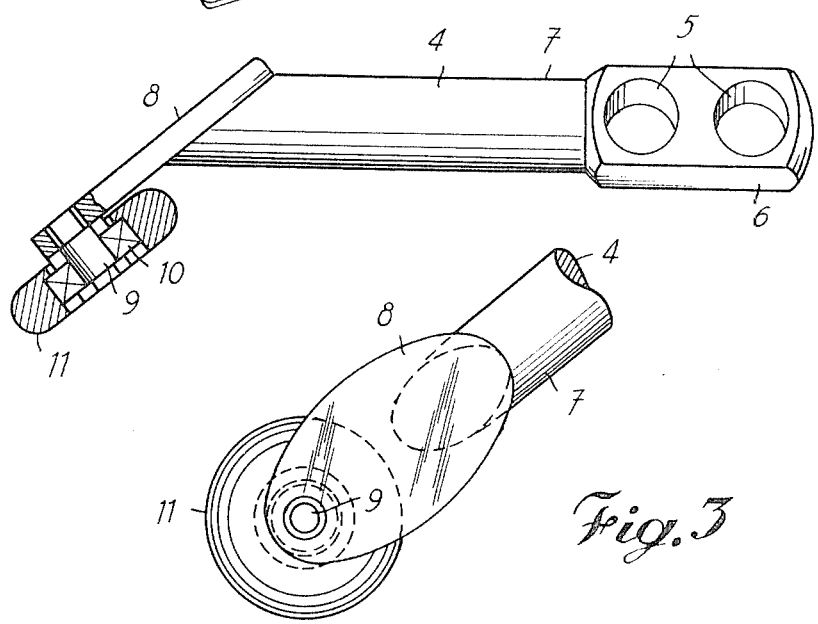
Fig.2
Fig.3
INVENTOR
VICTOR DUQUESNE
By Linton and Linton
ATTORNEYS

DEVICE FOR MOUNTING AND DISMOUNTING AUTOMOBILE TIRES

DESCRIPTION

The present invention relates to a device for mounting and dismounting automobile tires relative to their wheels.

In a known device, the automobile wheel is fixed on a support plate of an apparatus and traversed perpendicularly in its center by an axis integral with the support plate. Use is made of a lever, one end of which is provided with elements for mounting the tire, while the other end is provided with elements for dismounting the tire. The said lever in use presses against the above mentioned center of the axis, around which it is rotated to mount or dismount the tire.

For wheel discs with a relatively small central opening, as well as for wheel discs without a central opening, which consequently do not permit the passage of a central axis, it is necessary that the axis around which is rotated the above-mentioned lever be of special construction which can be fixed either on the discs of various types of wheel, or on the support plate of the apparatus. This causes a considerable drawback that for each kind of wheel it is necessary to make use of a specially suitable axis or support.

With a view to eliminating all these various constructions of axis and support, and to replace them by a single supporting element which may serve for any kind of wheel, the primary characteristic of the present invention is that it provides this supporting element with an arm, one end of which is provided with means bearing the lever, while at the other end there is a means pressing on the inner edge of the circumference of the rim of the wheel and moving along the latter when we displace the lever in a circular orbit.

By way of example, having no limiting character, the following is a description of a preferred method of execution of the device according to the present invention. This description refers to the accompanying drawing, in which, FIG. 1 is a perspective view of the device, as it is used for mounting a tire, FIG. 2 is a front view, partly in section, representing the supporting element which serves to uphold the mounting and dismounting lever, And FIG. 3 is an enlarged top view of the roller end of said supporting element.

The device according to the present invention includes a solid lever 1, one end of which is provided, in known fashion, with member 2 for mounting a tire, while the other end is provided with a member 3 for dismounting a tire. Said lever acts in conjunction with a supporting element 4. With this in mind, and according to the size of the wheel, said lever is introduced into one of the holes 5 in block 6 of element 4, part of which is formed by a bar 7 terminating in an inclined plate 8. Perpendicular to said plate there is fixed a pivot 9 around which is mounted, with the insertion of a ball bearing 10, a roller 11. Said roller can be made of metal, nylon or any other material, and can also be replaced by a fixed disc or the like. The block 6 is offset at an angle with respect to plate 8 bearing roller 11, hence lever 1 can be mounted at an incline in one of the holes in block 6, so that the wheel disc will not be touched, and the roller 11 may run perfectly on the inner circumference of the wheel rim.

To mount a tire, the wheel 12 is mounted in known fashion on a support plate of a known apparatus 13, and the tire is placed on the wheel. After this, the lever 1 is introduced, according to the size of the wheel, in one of the hole 5 in the supporting element 4, in such a way that the member 2 for mounting the tire can collaborate with the bead of the latter, after which the roller 11 is placed against the inner circumference of the wheel rim 12. When the free end of lever 1 is moved in a circle above the wheel, member 2 mounts the tire on the wheel, while lever 1 presses on element 4 which runs along the inner circumference of the wheel rim by means of the roller 11.

To dismount a tire, it is sufficient to reverse lever 1 and introduce it into one of the holes 5 in block 6 of element 4, in such a way that the member 3 will be introduced under the bead of the tire to be dismounted, after which the lever is moved in a circle as described above.

I claim:

1. A device for mounting and dismounting automobile tires, comprising a support plate capable of fixedly holding a wheel, a lever provided at one end with a member for mounting the tire and at the other end with a member for dismounting the tire, an arm, a block provided at one end of said arm and having at least one opening for the insertion of the mounting and dismounting lever, a roller at the other end of said arm capable of running along the inner edge of the wheel rim when said lever is moved in a circle in a horizontal plane.

2. A device according to claim 1, including a plate fixed on an incline to said arm other end, a pivot fixed perpendicularly to said plate, and a ball bearing on said pivot rotatably supporting said roller.

3. A device according to claim 1, wherein said block is provided with a plurality of holes to carry the mounting and dismounting lever, said block being offset at an angle with respect to said roller, by means of which arrangement said lever is placed at an angle with respect to said roller.